(12) United States Patent
Mikawa

(10) Patent No.: US 11,615,646 B2
(45) Date of Patent: Mar. 28, 2023

(54) TERMINAL APPARATUS, FUNCTION SUGGESTION METHOD, STORAGE MEDIUM, AND SERVER APPARATUS

(71) Applicant: CANON KABUSHIKI KAISHA, Tokyo (JP)

(72) Inventor: Atsushi Mikawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 110 days.

(21) Appl. No.: 17/164,943

(22) Filed: Feb. 2, 2021

(65) Prior Publication Data

US 2021/0240970 A1  Aug. 5, 2021

(30) Foreign Application Priority Data

Feb. 5, 2020  (JP) .............................. JP2020-018213

(51) Int. Cl.
*G06V 40/16* (2022.01)
*G06V 30/194* (2022.01)

(52) U.S. Cl.
CPC .......... *G06V 40/174* (2022.01); *G06V 30/194* (2022.01); *G06V 40/172* (2022.01)

(58) Field of Classification Search
None
See application file for complete search history.

(56) References Cited

U.S. PATENT DOCUMENTS

| 6,671,391 | B1 * | 12/2003 | Zhang | .................. | G06V 40/161 |
| | | | | | 382/118 |
| 9,225,896 | B2 | 12/2015 | Yamada | | |
| 10,788,890 | B1 * | 9/2020 | Watson | .................. | A61B 5/165 |
| 2019/0250934 | A1 * | 8/2019 | Kim | ........................ | G06V 40/28 |

FOREIGN PATENT DOCUMENTS

| JP | 2013109687 A | 6/2013 |
| JP | 5637930 B2 * | 12/2014 |
| JP | 2018036734 A | 3/2018 |

OTHER PUBLICATIONS

Song, I., Kim, H.J. and Jeon, P.B., Jan. 2014. Deep learning for real-time robust facial expression recognition on a smartphone. In 2014 IEEE International Conference on Consumer Electronics (ICCE) (pp. 564-567). IEEE.2014.*

* cited by examiner

*Primary Examiner* — Chan S Park
*Assistant Examiner* — Elisa M Rice
(74) *Attorney, Agent, or Firm* — Rossi, Kimms & McDowell LLP

(57) ABSTRACT

A terminal apparatus includes a controller configured to: transmit, to a server apparatus, a suggestion request requesting a suggestion of a function to be invoked; receive, from the server apparatus, a suggestion response that specifies a suggested function determined by the server apparatus; and invoke the suggested function. The suggestion request includes face image data of a user. The suggested function is determined by applying the face image data to a learned model. The controller is configured to: evaluate, based on face images of the user, a degree of change in facial expressions before and after invoking the suggested function; and transmit, to the server apparatus, a learning request requesting re-learning of the learned model when the evaluated degree of change in the facial expressions satisfies a predetermined condition.

13 Claims, 8 Drawing Sheets

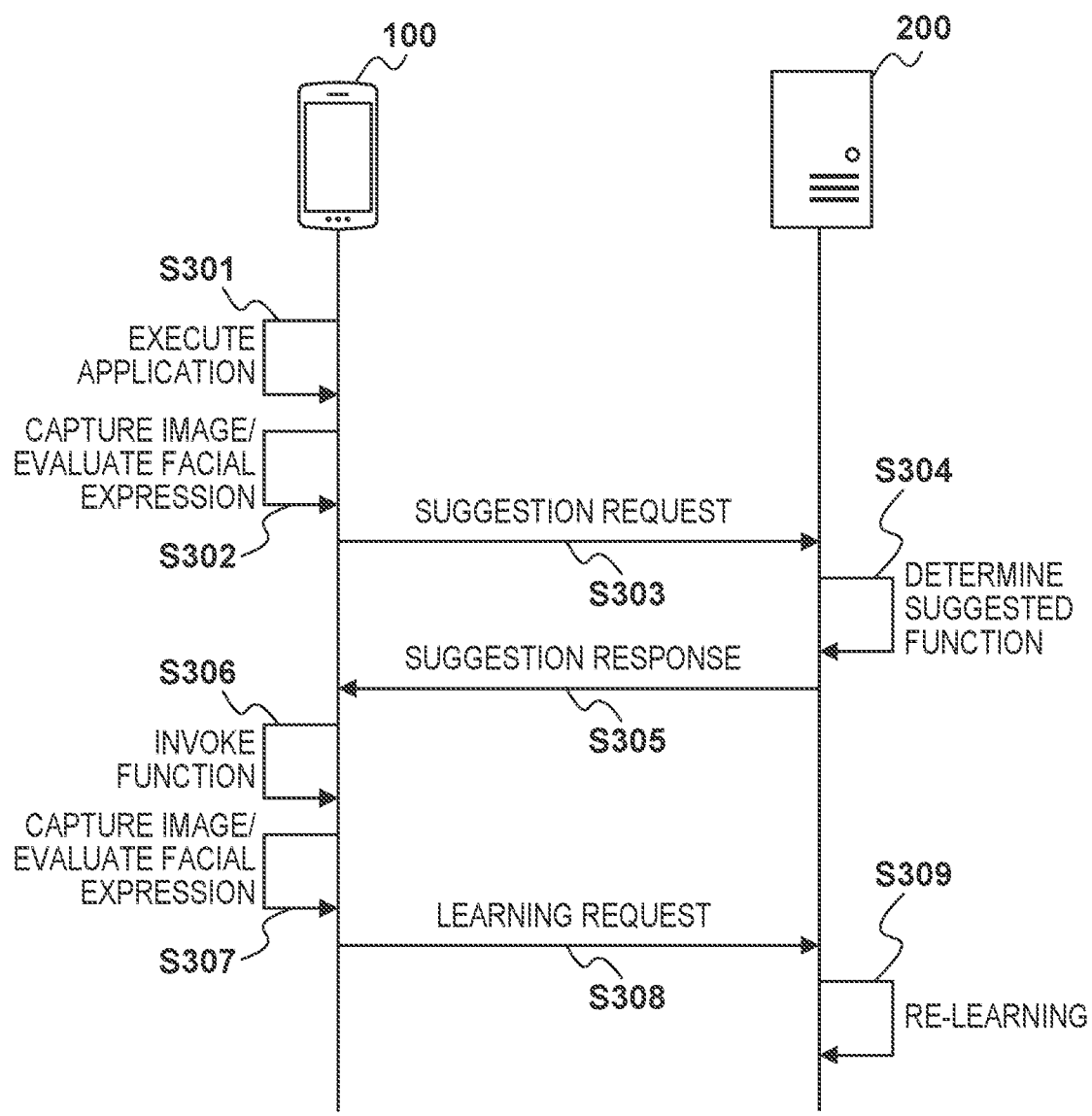

TERMINAL APPARATUS, FUNCTION SUGGESTION METHOD, STORAGE MEDIUM, AND SERVER APPARATUS

BACKGROUND OF THE INVENTION

Field of the Invention

The present disclosure relates to a terminal apparatus, a function suggestion method, a storage medium, and a server apparatus.

Description of the Related Art

In recent years, user terminals, such as smartphones, have become more and more multifunctional and functionally sophisticated. However, there are few users who can make full and flexible use of functions of a user terminal. Japanese Patent Laid-Open No. 2013-109687 focuses specifically on a case where a user is not aware of a function to enhance visibility of characters and discloses a mobile terminal that analyzes a state of a user seen in a captured image and automatically performs the function to enhance visibility of characters. The mobile terminal disclosed in Japanese Patent Laid-Open No. 2013-109687 detects, for example, a frowning action from a captured image as a change in user's facial expressions and performs the function to enhance visibility of characters in response to the change in facial expressions.

Japanese Patent Laid-Open No. 2018-36734 discloses a technique to learn changes in image feature amounts extracted from face images of persons in association with typical types of facial expressions in order to make it possible to precisely and quantitatively recognize a change in facial expressions of a person.

SUMMARY OF THE INVENTION

However, there are individual variations in changes of user's facial expressions. Hence, sufficient accuracy of facial expression recognition cannot be secured by merely analyzing face images in accordance with a known model or pattern, which results in difficulty in appropriately suggesting a function suitable for a user.

In light of the foregoing, it is desired to realize a mechanism which makes it possible to suggest a more appropriate function to a user based on the user's facial expression.

According to an aspect, there is provided a terminal apparatus including a communication interface configured to communicate with a server apparatus and a controller. The controller is configured to: transmit, via the communication interface to the server apparatus, a suggestion request requesting a suggestion of a function to be invoked in the terminal apparatus; receive, via the communication interface from the server apparatus, a suggestion response that specifies a suggested function determined by the server apparatus in response to the suggestion request; and invoke the suggested function specified by the suggestion response. The suggestion request includes face image data of a user of the terminal apparatus, and the suggested function is determined by applying the face image data to a learned model at the server apparatus. The controller is configured to: evaluate, based on face images of the user, a degree of change in facial expressions of the user before and after invoking the suggested function; and transmit, via the communication interface to the server apparatus, a learning request requesting re-learning of the learned model when the evaluated degree of change in the facial expressions satisfies a predetermined condition. A corresponding function suggestion method, a storage medium, and a server apparatus are also provided.

Further features of the present invention will become apparent from the following description of exemplary embodiments (with reference to the attached drawings).

BRIEF DESCRIPTION OF THE DRAWINGS

FIG. 3 is a sequence diagram illustrating an example of an overall flow of a suggestion process according to an embodiment;

DESCRIPTION OF THE EMBODIMENTS

Figure 1:
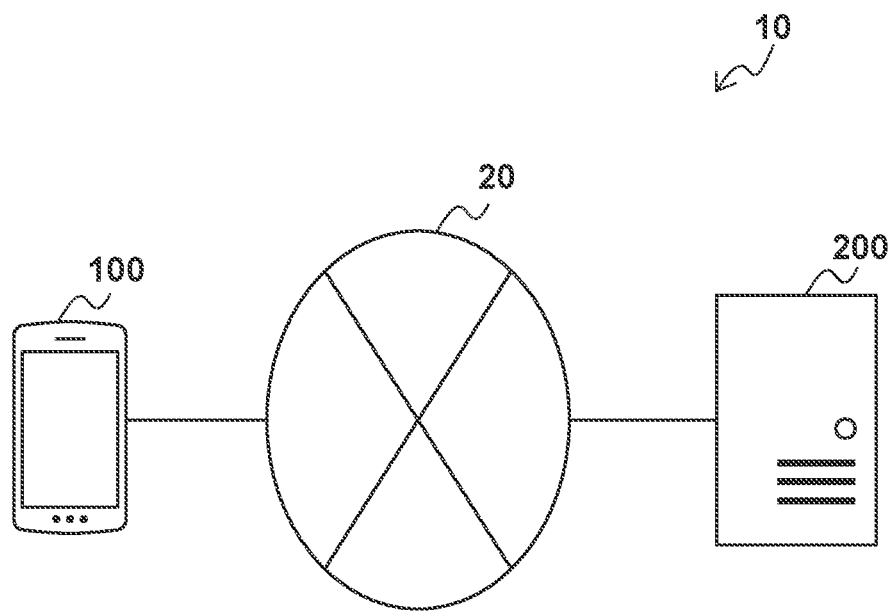
FIG. 1 a schematic diagram illustrating an example of an overall configuration of an information processing system according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

1. Overview

<1-1. Basic System Configuration>

FIG. 1 a schematic diagram illustrating an example of an overall configuration of an information processing system 10 according to an embodiment. Referring to FIG. 1, the information processing system 10 includes a user terminal 100 and a suggestion server 200 which are connected to each other via a network 20. The network 20 may be any type of network such as a local area network (LAN), a provider network or the Internet, or a combination of two or more of those networks, for example. The user terminal 100 is a terminal apparatus that is operated by a user and executes various applications. The user terminal 100 may be any type of terminal apparatus such as a smartphone, a mobile phone, a personal computer (PC), a tablet, a navigation apparatus, a digital camera, a printer, a scanner or a multifunction peripheral, for example. The suggestion server 200 is a server apparatus that is responsible for suggesting, to the user terminal 100, a function to be invoked. The suggestion server 200 may be any type of information processing apparatus such as a computer or a work station, for example. Note that the functionalities of the suggestion server 200 described below may be realized by a single computer, or by multiple computers cooperating with each other. In the case where multiple computers cooperate, they communicate with each other using a communication protocol such as LAN or Bluetooth®, for example.

<1-2. Hardware Configurations of Respective Apparatuses>

(1) User Terminal

Figure 2A:
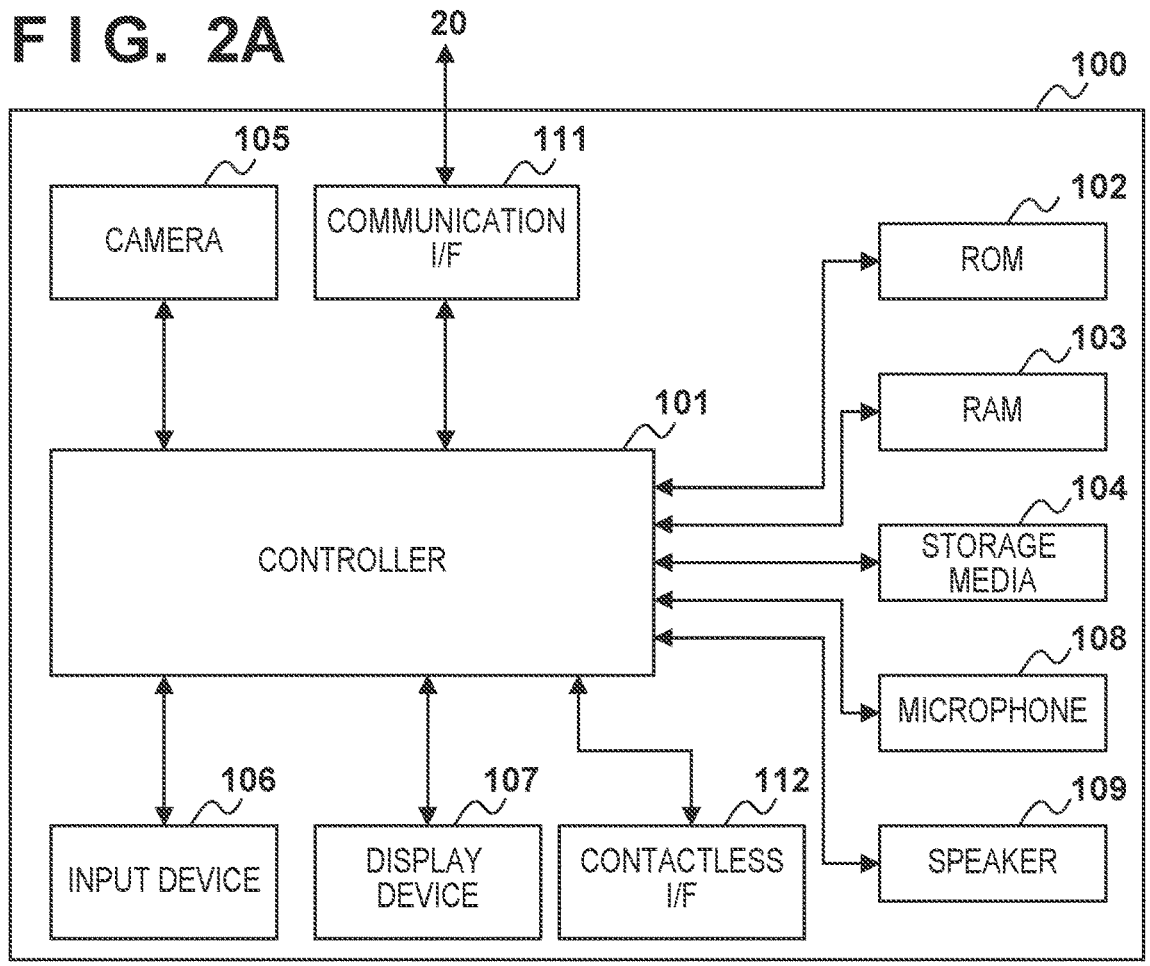
FIG. 2A is a block diagram illustrating an example of a hardware configuration of a user terminal according to an embodiment.

FIG. 2A illustrates an example of a hardware configuration of the user terminal 100 according to the present embodiment. The user terminal 100 includes a controller 101, a ROM 102, a RAM 103, a storage medium 104, a camera 105, an input device 106, a display device 107, a microphone 108, a speaker 109, a communication I/F 111, and a contactless I/F 112.

The controller 101 is a control unit that controls respective sections of the user terminal 100 by executing computer programs mentioned later. Though FIG. 2A illustrates an example where the user terminal 100 include one controller 101, the user terminal 100 may include two or more controllers. The ROM (Read-Only Memory) 102 is a nonvolatile memory. The ROM 102 stores a basic software (also referred to as an operating system (OS)) and various application programs of the user terminal 100, for example. The ROM 102 may store a computer program for communicating with the suggestion server 200 to receive, from the suggestion server 200, a suggestion of a function to be invoked, for example. The RAM (Random Access Memory) 103 is a so-called main memory. The RAM 103 provides the controller 101 with a temporary work memory area. The RAM 103 may temporarily store image data to be displayed by the display device 107, for example. The storage medium 104 is a storage medium for recording captured image data generated by the camera 105. The storage medium 104 may be included inside the user terminal 100, or may be attachable to and removable from the user terminal 100.

The camera 105 is an imaging device that may include an optical system, imaging elements and an image processing unit, for example. The camera 105 generates a captured image (that is, images a subject) by converting an optical image of the subject to an electrical signal through photoelectric conversion at the imaging elements. Then, after performing image processing such as noise reduction, for example, the camera 105 outputs captured image data to the controller 101. The captured image data is recorded by the controller 101 in the storage medium 104, for example. Note that, in the present embodiment, the camera 105 includes at least a front camera that is capable of imaging a subject with an imaging angle facing the same side as the screen of the display device 107 of the user terminal 100. The input device 106 is a device that receives an instruction and information input from a user who uses the user terminal 100. The input device 106 may include one or more of a button, a switch, a keypad, a touch sensor, a keyboard, and a pointing device, for example. The display device 107 is a device that displays an image and information to be presented to the user. The display device 107 may include a touch screen. Note that, instead of the display device 107, an external display connected to the user terminal 100 via a certain connection interface may display an image and information for the user of the user terminal 100. The microphone 108 is a speech obtaining device that collects speech uttered by the user. The microphone 108 outputs an input speech signal representing contents of the collected speech to the controller 101. The speaker 109 is a speech reproduction device that reproduces speech based on an output speech signal from the controller 101. In the present specification, an example where a user interaction is performed by the user terminal 100 via a graphical user interface (GUI) displayed by the display device 107 is mainly described. However, the described interaction may be realized as a speech interaction via the microphone 108 and the speaker 109.

The communication interface (I/F) III is a communication device for the user terminal 100 to communicate with another apparatus. The communication I/F 111 may be a wireless communication interface that includes an antenna, a radio frequency (RF) circuit and a baseband circuit, for example. The communication I/F 111 may support any type of wireless communication protocol such as wireless LAN, LTE, LTE-Advanced, or 3GPP NR, for example. The communication I/F III may use PTP/IP (Picture Transfer Protocol over Internet Protocol) utilizing wireless LAN for the purpose of image data communication, for example. Additionally, the communication I/F 111 may be a wired communication interface such as a network interface card (NIC). The communication I/F 111 may support any type of wired communication protocol such as LAN, HDMI® or IEEE1394, for example. In the present embodiment, the user terminal 100 communicates with the suggestion server 200 via the communication I/F 111. The user terminal 100 may be connected directly to the suggestion server 200 or indirectly via an intermediate node such as an access point to the suggestion server 200. The contactless I/F 112 is a short-range communication device for the user terminal 100 to perform contactless communication. The contactless I/F 112 may include an antenna, modulation and demodulation circuits and a communication controller, for example. The contactless I/F 112 may be a Near Field Communication (NFC) interface that operates in compliance with ISO/IEC 18092 standard, for example. Alternatively, the contactless I/F 112 may be a Bluetooth® interface that operates in compliance with IEEE802.15.1 standard, for example. Note that the user terminal 100 may support another type of communication protocol such as Universal Serial Bus (USB) or Infrared Data Association (IrDA). The communication between the user terminal 10*t* and the suggestion server 200 may also be performed via the contactless I/F 112 instead of the communication I/F 111.

(2) Suggestion Server

Figure 2B:
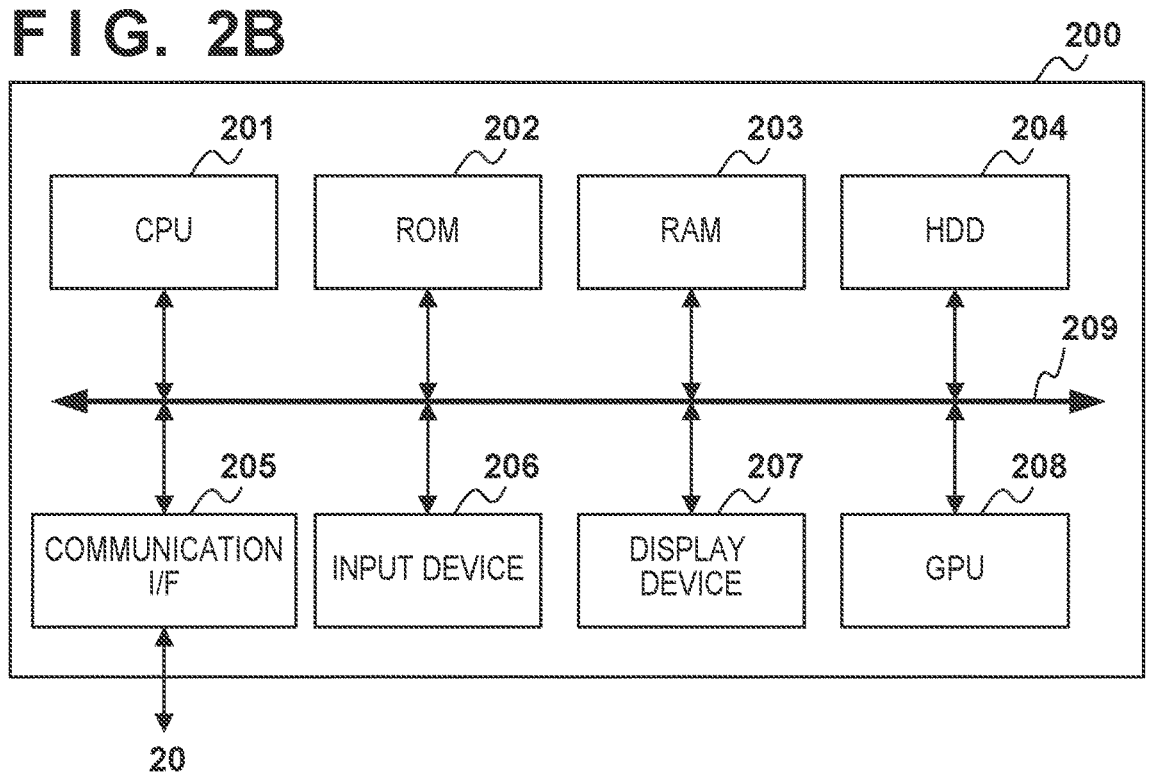
FIG. 2B is a block diagram illustrating an example of a hardware configuration of a suggestion server according to an embodiment.

FIG. 2B illustrates an example of a hardware configuration of the suggestion server 200 according to the present embodiment. The suggestion server 200 includes a CPU 201, a ROM 202, a RAM 203, an HDD 204, a communication I/F 205, an input device 206, a display device 207 and a GPU 208.

The CPU (Central Processing Unit) 201 is a processor which implements a suggestion function of the suggestion server 200 by executing a computer program mentioned later. Though FIG. 2B illustrates an example where the suggestion server 200 include one CPU 201, the suggestion server 200 may include two or more CPUs. The ROM 202 is a nonvolatile memory. The ROM 202 stores a boot program and a basic software of the suggestion server 200, for example. The RAM 203 is a so-called main memory. The RAM 203 provides the CPU 201 with a temporary work memory area. The HDD (Hard Disk Drive) 204 is a so-called auxiliary storage device. The HDD 204 may store a computer program for suggesting, to the user terminal 100, a function to be invoked in the user terminal 100 in response to a suggestion request received from the user terminal 100, for example. Note that, instead of a hard disk, another type of storage medium such as a semiconductor memory or an optical disk, for example, may be utilized in an auxiliary storage device of the suggestion server 200.

The communication I/F 205 is a communication device for the suggestion server 200 to communicate with another apparatus. The communication 1F 205 may be, for example, a wireless communication interface that includes an antenna, a RF circuit and a baseband circuit, or may be a wired communication interface such as a NIC. The communication I/F 205 may support any type of communication protocol as exemplified in connection with the communication I/F III of the user terminal 100. In the present embodiment, the suggestion server 200 communicates with the user terminal 100 via the communication I/F 205.

The input device 206 is a device that receives an instruction and information input to the suggestion server 200. The input device 206 may include one or more of a button, a switch, a keypad, a touch sensor, a keyboard, and a pointing device, for example. The display device 207 is a device that displays an image and information. The display device 207 may include a touch screen. The GPU (Graphics Processing Unit) 208 is a processor dedicated for learning processing that is capable of executing the same type of numerous computations rapidly in parallel. The GPU 208 operates in conjunction with the CPU 201, and executes a part of computations for functions of the suggestion unit 230 and the learning unit 250 described later, for example.

<1-3. Issues>

In recent years, terminal apparatuses like the user terminal 100 have become more and more multifunctional and functionally sophisticated. An application of a terminal apparatus may offer some user-aiding functions so that usability is optimized for a variety of users with different attributes such as age, language, preference and the like. For example, applications, such as a web browser and a mailer, which display texts may offer a dictionary function and a language setting function to aid a user in understanding contents of the texts. A contents player to reproduce images and movies may offer a brightness changing function to aid a user in viewing contents. However, there are few users who can make full and flexible use of such functions of a terminal apparatus and, in some cases, a user is even not aware that such a function exists.

One possible approach to solve the above issues may be that a system analyzes face images of a user to recognize a change in facial expressions of the user and suggests, to the user, a function estimated to be suitable for the user based on the recognized change. However, there are individual variations in changes of user's facial expressions. Hence, sufficient accuracy of facial expression recognition cannot be secured by merely analyzing face images in accordance with a known model or pattern, which results in difficulty in appropriately suggesting a function suitable for a user. In light of the foregoing, the information processing system 10 improves the technique of suggesting a function based on facial expression recognition by using a mechanism described as follows.

<1-4. Basic Mechanism>

FIG. 3 is a sequence diagram illustrating an example of an overall flow of a suggestion process that may be performed in the information processing system 10. The user terminal 100 and the suggestion server 200 are involved in the suggestion process illustrated in FIG. 3.

First, in S301, the user terminal 100 executes one of applications (APs) installed in the user terminal 100. The executed application causes the display device 107 to display an application screen. A user views contents on the application screen or operates the application screen. It is expected that the user changes his or her facial expression when he or she feels inconvenience or dissatisfaction in the viewing or the operation.

In S302, the user terminal 100 images the user using the camera 105 and generates a captured image. Herein, it is assumed that a face image in which a face of the user is captured is generated. The user terminal 100 quantitatively evaluates a degree of change in facial expressions of the user by analyzing the face image. In a case where an evaluated value calculated from the evaluation result satisfies a certain condition, in S303, the user terminal 100 transmits a suggestion request to the suggestion server 200. The suggestion request may include face image data of the user imaged by the camera 105. The suggestion request is received by the suggestion server 200.

In S304, the suggestion server 200 determines a function to be invoked in the user terminal 100 by applying the user's face image data included in the received suggestion request to a learned model. For example, a user who has encountered an unknown word during viewing a web browser may put a frowning expression on his or her face. In that case, the suggestion server 200 may suggest invoking a dictionary function that searches for the meaning of the word to display it. In S305, the suggestion server 200 transmits, to the user terminal 100, a suggestion response that specifies the determined function to be suggested. The suggestion response is received by the user terminal 100.

In S306, the user terminal 100 invokes the suggested function specified by the received suggestion response. The user is expected to turn his or her facial expression back to normal (or to change it to more positive one) in a case where his or her inconvenience or dissatisfaction is resolved as a result of the suggested function being invoked.

In S307, the user terminal 100 images again the user using the camera 105 and generates a face image of the user. The user terminal 100 quantitatively evaluates a degree of change in facial expressions of the user by analyzing the face image. Then, in S308, the user terminal 100 transmits, to the suggestion server 200, a learning request requesting re-learning of the learned model in a case where the degree of change in the user's facial expressions before and after invoking the suggested function satisfies a certain condition. The learning request is received by the suggestion server 200.

In S309, in response to receiving the learning request, the suggestion server 200 performs re-learning of the learned model that was used in S304. For example, in a case where the user's inconvenience or dissatisfaction has been resolved as a result of suggesting the function, the suggestion server 200 performs the re-learning of the learned model using the face image indicated by the face image data received in S303 as an image for learning with the suggested function as the right function.

In this manner, by repetitively performing re-learning which uses a user's actual face image, the learned model will adaptively learn changes in the user's facial expressions, which enables the suggestion server 200 to suggest a function more suitable to the user. Configurations of the user terminal 100 and the suggestion server 200 for realizing such a re-learning mechanism will be described in more detail from the next section.

2. Detailed Configurations of Respective Apparatuses

<2-1. User Terminal>

Figure 4A:
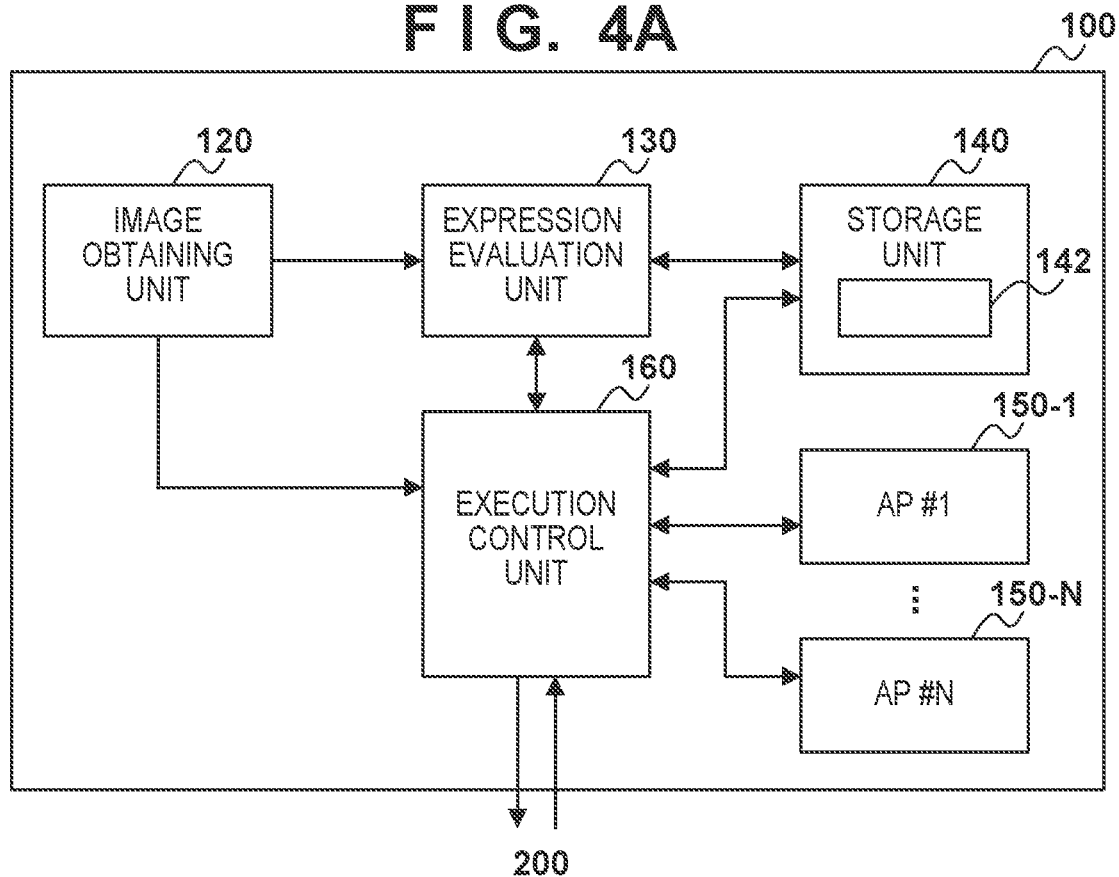
FIG. 4A is a block diagram illustrating an example of a functional configuration of a user terminal according to an embodiment.

FIG. 4A is a block diagram illustrating an example of a functional configuration of the user terminal 100 according to the present embodiment. Referring to FIG. 4A, the user terminal 100 includes an image obtaining unit 120, an expression evaluation unit 130, a storage unit 140, N application units 150-1 to 150-N, and an execution control unit 160. Note that, though the user terminal 100 may have many further functional blocks other than those illustrated in FIG. 4A, the functional blocks that are not related to function suggestion are omitted in the illustration and explanation here in order not to obscure the description.

The image obtaining unit 120 obtains a face image of a user captured by the camera 105. The image obtaining unit 120 may obtain face images of the user periodically, or may obtain a face image of the user when a predetermined user input to the input device 106 or a predetermined speech input to the microphone 108 is detected. The image obtaining unit 120 outputs face image data representing the obtained face image to the expression evaluation unit 130 and the execution control unit 160.

The expression evaluation unit 130 calculates a facial expression evaluated value for quantitatively recognizing a change in user's facial expressions based on the user's face image obtained by the image obtaining unit 120. In the present embodiment, the expression evaluation unit 130 obtains the facial expression evaluated value by applying the user's face image to an evaluation model 142 stored in advance in the storage unit 140. As an example, the evaluation model 142 may be a learned model that has been acquired in advance through machine learning.

Figure 5A:
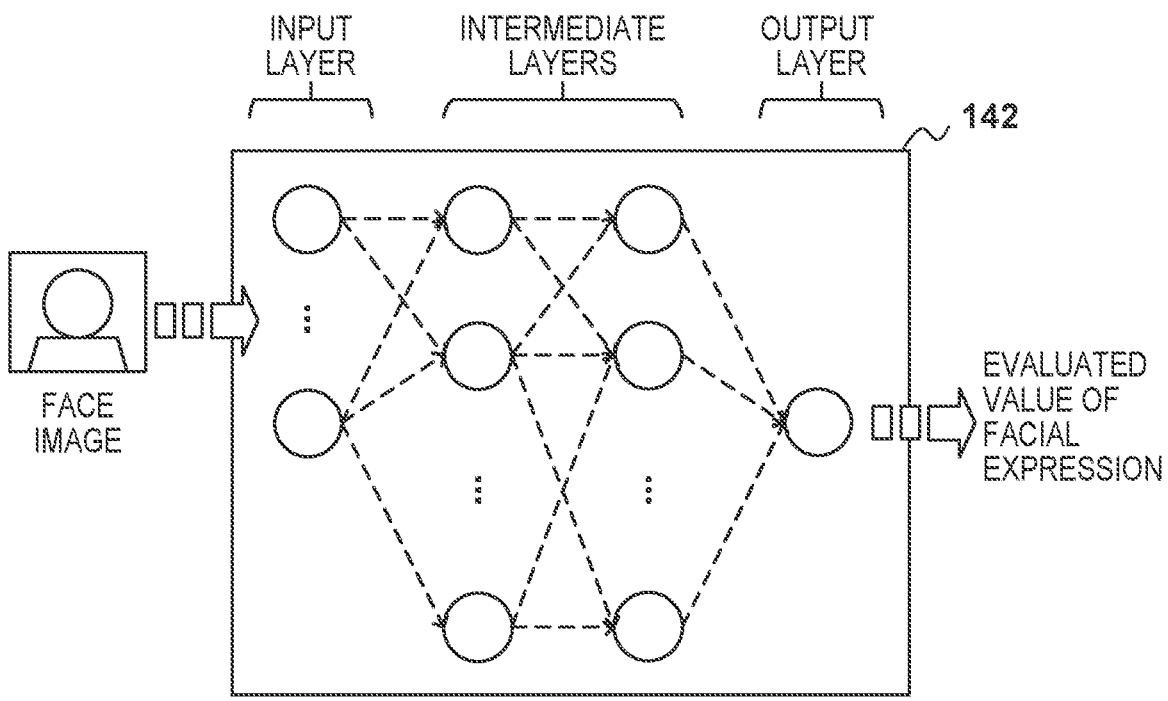
FIG. 5A is an explanatory diagram for describing an example of input and output data of a type of learned model.

FIG. 5A is an explanatory diagram for describing an example of input and output data of the evaluation model 142. Herein, the evaluation model 142 is assumed to be a neural network model. Referring to FIG. 5A, the evaluation model 142 includes an input layer, a plurality of intermediate layers and an output layer. The evaluation model 142 receives face image data (pixel value data of pixels that are arranged two-dimensionally) of a user as an input data. Then, the evaluation model 142 outputs an evaluated value of facial expression within the range of [0, 1], for example, as a result of computation of the neural network model.

In a learning phase, the evaluation model 142 receives face images (sample images) of several persons as images for learning. Each image for learning is labeled in advance with a degree of satisfaction expressed in a user's facial expression that appears in the image as training data. The degree of satisfaction is also a value within the range of [0, 1]. The labeling of the degree of satisfaction may be subjectively done by an engineer who checks each image for learning. Alternatively, scoring for the degree of satisfaction may be done based on image feature amounts such as positional relationship between a face area and feature points (for example, corners of eyes, nose, mouth and eyebrows), curvature of a curve tracing the corners of eyes and lips, and a ratio of a black eye area to an eye area, for example. In general, a facial expression of a user who is satisfied with a status of an application without feeling any inconvenience (for example, a smiling or nodding face) may be given a higher evaluated value (for example, a value close to one). Conversely, a facial expression of a user who is feeling inconvenience or dissatisfaction (for example, a frowning face or lowered eyes) may be given a lower evaluated value (for example, a value close to zero). In the learning phase, inputting an image for learning to the evaluation model 142, calculating the facial expression evaluated value in accordance with model parameters, and modifying the model parameters based on an error of the evaluated value with respect to training data are iteratively performed for each of a large number of images for learning. As a result of a sufficient number of iterations, the evaluation model 142 becomes a model which is precise to some extent for calculating a facial expression evaluated value which quantitatively represents a change in facial expressions based on a user's face image. Note that, typically, the process in the learning phase is performed by an apparatus that is separate from the user terminal 100. The user terminal 100 may then download the already-acquired learned model to the storage unit 140 to utilize it. However, it is of course possible that the user terminal 100 performs the process in the learning stage.

It should be noted that the evaluation model 142 is not limited to a learned model that has been learned through machine learning as described using FIG. 5A. For example, the expression evaluation unit 130 may calculate the facial expression evaluated value using another type of model such as a mathematical model that describes a mathematical relationship between image feature amounts and facial expression evaluated values, instead of using a learned model.

In the present embodiment, the expression evaluation unit 130 obtains a first facial expression evaluated value before transmitting a suggestion request to the suggestion server 200 (that is, before invoking a suggested function, in S302 of FIG. 3), and obtains a second facial expression evaluated value after invoking the suggested function (in S307 of FIG. 3). The first facial expression evaluated value is calculated by applying, to the evaluation model 142, the user's first face image captured before transmitting the suggestion request. The second facial expression evaluated value is calculated by applying, to the evaluation model 142, the user's second face image captured after invoking the suggested function. The change from the first facial expression evaluated value to the second facial expression evaluated value may correspond to the degree of change in the facial expressions of the user, which is caused by the invocation of the suggested function. The execution control unit 160 described later transmits a learning request to the suggestion server 200 depending on this degree of change in the facial expressions of the user.

The storage unit 140 stores face image data of the user obtained by the image obtaining unit 120, the above-described evaluation model 142, user identification information that identifies each user, and AP identification information that identifies each running application. In addition, the storage unit 140 stores an application list, a function list and mapping information, of which examples will be given in Tables 1 to 3 below.

The application units 150-1 to 150-N are functional blocks respectively corresponding to various applications of the user terminal 100. For example, the application unit 150-1 may correspond to a web browser, the application unit 150-2 may correspond to a mailer, the application unit 150-3 may correspond to an instant messenger, and the application unit 150-4 may correspond to a content player. However, these are mere examples, and the user terminal 100 may have any combination of applications.

Each of the applications executable in the user terminal 100 is uniquely identified by the AP identification information (for example, an AP ID). A function that can be invoked in the user terminal 100 is uniquely identified by the function identification information (for example, a function ID). The following Table 1 shows an example of a list of applications identified by AP IDs.

TABLE 1

Example of Application List

| AP ID | APPLICATION NAME |
|---|---|
| A1 | Web Browser |
| A2 | Mailer |
| A3 | Instant Messenger |
| A4 | Photo Album |
| A5 | Movie Player |

The following Table 2 shows an example of a list of functions identified by function IDs. As understood from Tables 1 and 2, there may exist an application (for example, a web browser) which is one of functions that can be invoked when another application is running.

TABLE 2

Example of Function List

| FUNCTION ID | FUNCTION NAME |
|---|---|
| F1 | Dictionary |
| F2 | Language Setting |
| F3 | Change Brightness |
| F4 | Camera |
| F5 | Web Browser |

The user terminal 100 and the suggestion server 200 share mapping information, in advance, that indicates which functions can be invoked when running each application. In a practical example, invocation of a function based on suggestion from the system may be disabled when a specific type of application is running. For which type of applications the suggestion of function is disabled may be defined statically in advance, or may be configurable by the user. The following Table 3 shows an example of the mapping information that associates each application with functions that can be invoked when the application is running.

TABLE 3

Example of Mapping Information

| AP ID | SUGGESTION | INVOCABILITY OF FUNCTIONS | | | | |
|---|---|---|---|---|---|---|
| | | F1 | F2 | F3 | F4 | F5 |
| A1 | Enabled | YES | YES | YES | | |
| A2 | Enabled | YES | YES | YES | YES | |
| A3 | Enabled | YES | YES | YES | YES | YES |
| A4 | Enabled | | | YES | YES | |
| A5 | Disabled | | | | | |

In the example of Table 3, out of the five types of applications, invocation of a function based on system suggestion is enabled for four types of applications other than Movie Player with the AP ID "A5". For Web Browser ("A1"), candidate functions to be invoked include Dictionary ("F1"), Language Setting ("F2"), and Change Brightness ("F3"). For Mailer ("A2"), candidate functions to be invoked include Dictionary ("F1"), Language Setting ("F2"), Change Brightness ("F3"), and Camera ("F4"). For Instant Messenger ("A3"), candidate functions to be invoked include Dictionary ("F1"), Language Setting ("F2"), Change Brightness ("F3"), Camera ("F4"), and Web Browser ("F5"). For Photo Album ("A4"), candidate functions to be invoked include Change Brightness ("F3") and Camera ("F4").

The execution control unit 160 controls execution of applications and execution of related functions in the user terminal 100. For example, the execution control unit 160 executes application designated by a user via the input device 106. The execution control unit 160 monitors facial expression evaluated values obtained by the expression evaluation unit 130 while the application is running. For example, the execution control unit 160 transmits, via the communication I/F 111 to the suggestion server 200, a suggestion request requesting a suggestion of a function to be invoked in the user terminal 100 when a facial expression evaluated value falls below a threshold for the suggestion request (hereinafter, referred to as suggestion request threshold). The execution control unit 160 includes face image data in which the user's face is captured in the suggestion request transmitted to the suggestion server 200. Then, the execution control unit 160 receives, via the communication I/F 111 from the suggestion server 200, a suggestion response that specifies a suggested function determined by the suggestion server 200 in response to the suggestion request. The suggested function is determined by applying the face image data included in the suggestion request to a learned model 242 described later at the suggestion server 200.

In the present embodiment, the execution control unit 160 further includes, in the suggestion request, an AP ID identifying the application running in the user terminal 100. This allows the suggestion server 200 to determine a suggested function which is different depending on the running application.

Figure 5B:
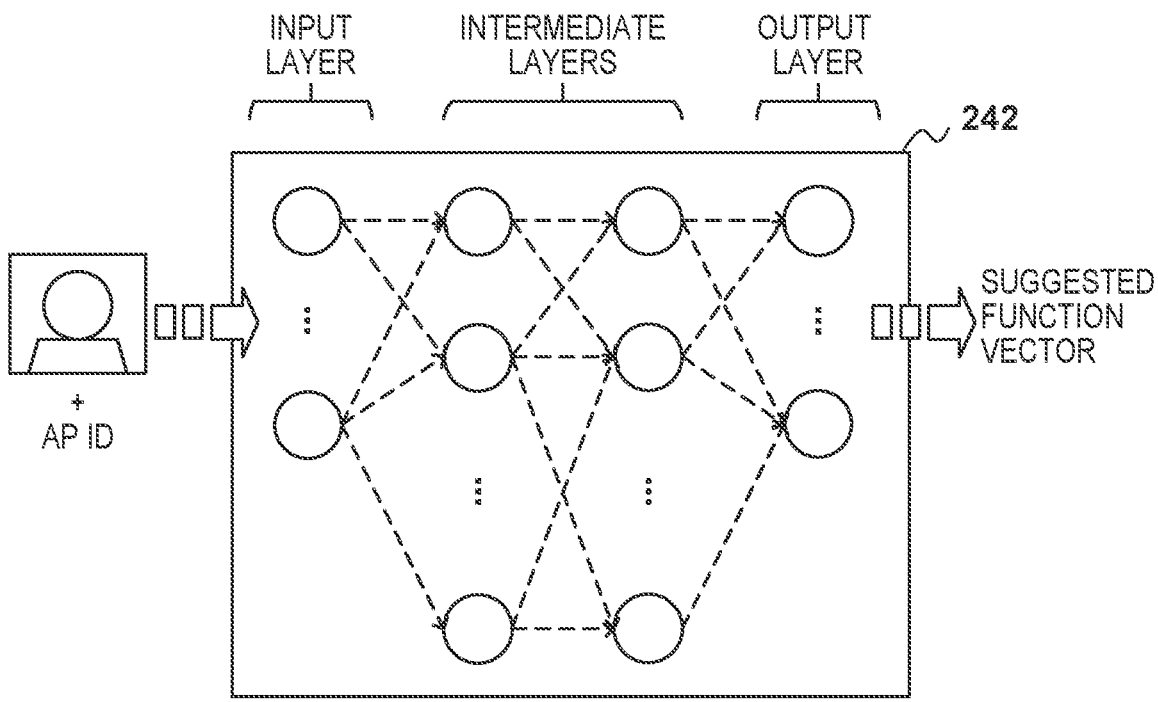
FIG. 5B is an explanatory diagram for describing an example of input and output data of another type of learned model.

FIG. 5B is an explanatory diagram for describing an example of input and output data of the learned model 242 retained by the suggestion server 200. Herein, the learned model 242 is assumed to be a neural network model. Referring to FIG. 5B, the learned model 242 includes an input layer, a plurality of intermediate layers and an output layer. The learned model 242 receives face image data of a user and an AP ID as an input data. The AP ID here is identification information that identifies an application running in the user terminal 100. The learned model 242 outputs a suggested function vector as a result of computation of the neural network model. For example, five functions are listed in the function list of Table 2. In this case, the suggested function vector maybe a five-dimensional vector. The five element values of the suggested function vector indicate values in the range of [0, 1] which are normalized such that the total sum is equal to one as a result of softmax function computation at the output layer, for example. The value of each element indicates a degree to which invoking the corresponding function is suitable for the user. For example, in a case where the first element in the suggested function vector indicates the highest value, the dictionary function ("F1") listed first in the function list may be determined to be the suggested function. In a case where the second element in the suggested function vector indicates the highest value, the language setting function ("F2") listed second in the function list may be determined to be the suggested function. The same applies to the meanings of the values of the other elements. Note that a function which is not associated with the AP ID designated by the suggestion request in the mapping information shown in Table 3 (the function is not invocable) may be ignored in determining the suggested function.

In an alteration example, the suggested function vector may additionally include one element for a conclusion of "No Function Suggested". In this case, if five functions are listed in the function list, the suggested function vector output from the learned model 242 will be six-dimensional vector. Then, in a case where the element corresponding to "No Function Suggested" indicates the highest value in the suggested function vector, the suggestion server 200 may determine that no function will be a suggested function.

In another alteration example, the learned model 242 may be provided separately for each application. In this case, the number of dimensions of a suggested function vector output from a learned model 242 for an application may correspond to the number of functions associated with that application in the mapping information of Table 3.

In a learning phase, the learned model 242 receives combinations of face images (sample images) of several persons and AP IDs as data for learning. Each sample image is a face image captured immediately before the time when a sample user invoked a desired function, and each AP ID identifies an application that was running at that time. The pair of the face image and the AP ID is assigned, as training data, a suggested function vector that indicates "1" for a function invoked by the sample user and "0" for the other candidate functions. In the learning phase, inputting an image for learning to the learned model 242, calculating the suggested function vector in accordance with model parameters, and modifying the model parameters based on an error of the suggested function vector with respect to training data are iteratively performed for each of a large number of pieces of data for learning. As a result of a sufficient number of iterations, the learned model 242 becomes a model for determining a suggested function based on a user's face image and an AP ID.

In the present embodiment, the learned model 242 may be maintained for each user by the suggestion server 200. For an initial period of introduction when re-learning has not yet been performed, the sets of model parameter values constituting the learned models 242 may be common to all users. However, as a result of repetitively-performed re-learning described later, the learned models 242 will reflect individual differences in facial expressions of individual users. In order to allow access to such a user-specific learned model 242, the execution control unit 160 may include user identification information (for example, a user 1D) that identifies a user in a suggestion request to transmit it to the suggestion server 200.

Figure 6:
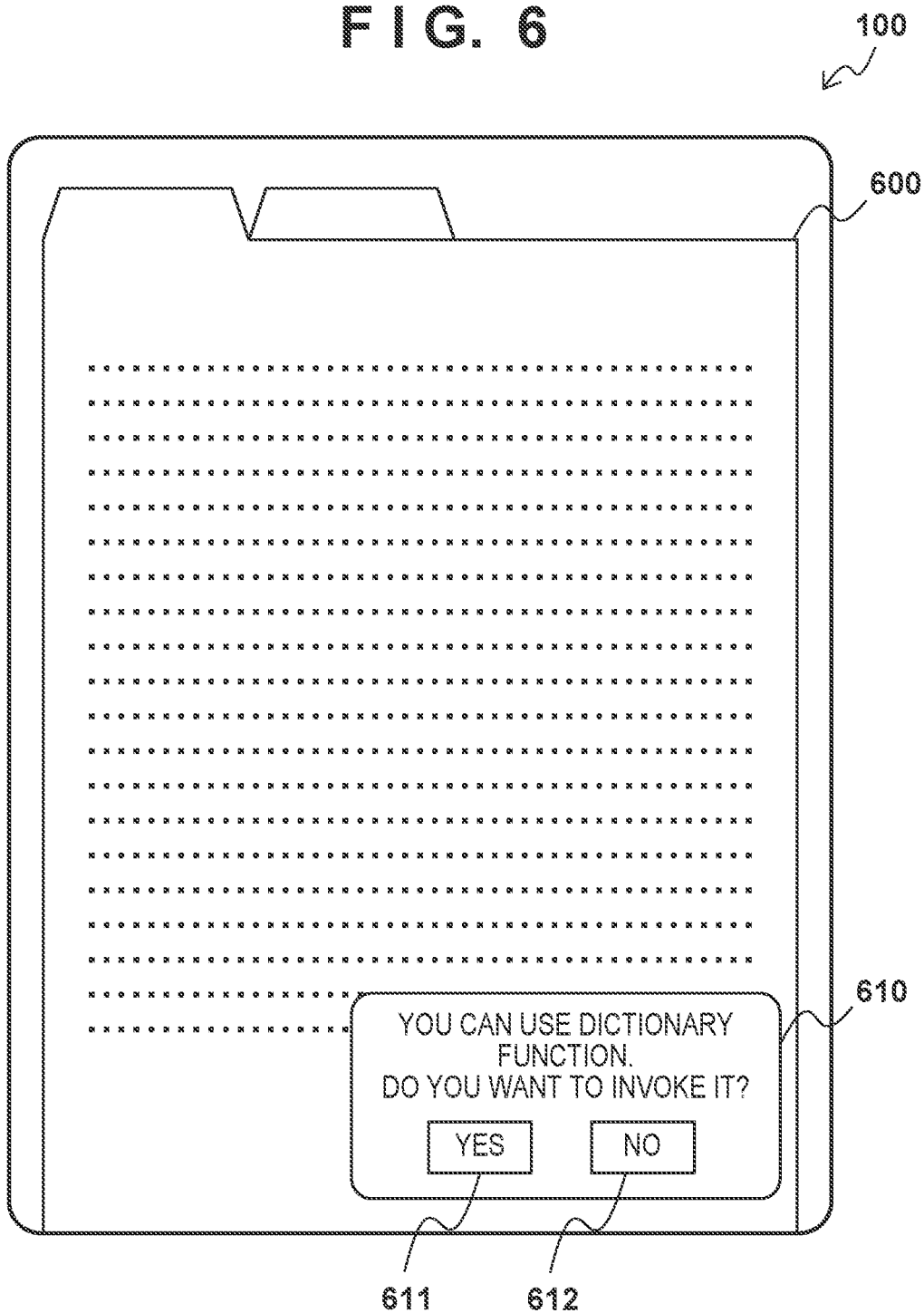
FIG. 6 is an explanatory diagram illustrating an example of a user interface for requesting an approval from a user for invoking a suggested function.

The execution control unit 160 invokes a suggested function specified by a suggestion response in response to receiving the suggestion response from the suggestion server 200. Before invoking the suggested function, the execution control unit 160 may request an approval for invoking the suggested function from the user. FIG. 6 is an explanatory diagram illustrating an example of a user interface for requesting an approval from a user for invoking a suggested function. Referring to FIG. 6, the user terminal 100 displays an application screen 600 over which a pop-up window 610 is superimposed at the bottom right part of the application screen 600. The pop-up window 610 indicates a message that requests an approval from the user for invoking a dictionary function specified as a suggested function. For example, the user can approve invocation of the dictionary function by selecting a button 611 of the pop-up window 610, or refuse invocation of the dictionary function by selecting the button 612. The execution control unit 160 may invoke the suggested function in a case where the invocation of the suggested function is approved by the user as a result of such an interaction.

It should be noted that the execution control unit 160 may request an approval from the user for invocation of the suggested function or may prompt the user to invoke the suggested function not though the pop-up window as shown in FIG. 6 but through another user interface. For example, the execution control unit 160 may cause the display device 107 to display an icon or a shortcut link for receiving an instruction to invoke the suggested function, or may cause the speaker 109 to reproduce a speech message that introduces the suggested function.

After the suggested function is invoked, the execution control unit 160 continues monitoring the facial expression evaluated value obtained by the expression evaluation unit 130. Then, in a case where the evaluated degree of change in the user's facial expressions satisfies a predetermined condition, the execution control unit 160 transmits, via the communication I/F III to the suggestion server 200, a learning request requesting that re-learning of the learned model 242 be performed using the user's face image data. The predetermined condition here may include, for example, that a difference of the second facial expression evaluated value obtained after the invocation of the suggested function with respect to the first facial expression evaluated value obtained before the invocation of the suggested function is above a threshold for the learning request (hereinafter, referred to as a learning request threshold). The first facial expression evaluated value here may be an evaluated value lower than the suggestion request threshold that has triggered the transmission of the suggestion request. The change that the second facial expression evaluated value has risen the learning request threshold above the first facial expression evaluated value may mean that the invocation of the suggested function has significantly improved the degree of the user's satisfaction. In such a case, it is inferred that the invoked suggested function was really suitable for the user. Hence, by performing re-learning using the pair of the face image represented by the face image data included in the suggestion request and the AP ID as data for learning, the possibility that the subsequent processes suggest an appropriate function to be invoked based on the learned model 242 can be raised. In this re-learning, a suggested function vector that indicates "1" for the suggested function (that has improved the facial expression evaluated value) and "0" for the other candidate functions is utilized as training data. The execution control unit 160 includes a user ID in the learning request, too. The re-learning of the learned model may be performed at the suggestion server 200 per user basis to acquire a user-specific model based on this user ID.

In a case where the degree of change in the user's facial expressions does not satisfy the above predetermined condition after invoking the suggested function, the execution control unit 160 may transmits, to the suggestion server 200, a suggestion result notification indicating that the degree of the user's satisfaction has not been significantly improved, for example. In a case where the invocation of the suggested function has been refused, the execution control unit 160 may transmit, to the suggestion server 200, a suggestion result notification indicating that the invocation of the suggested function has been refused. These suggestion result notifications imply to the suggestion server 200 that the suggested function was not suitable for the user. Then, the suggestion server 200 may perform re-learning of the learned model based on a suggestion result notification. The training data for the re-learning in this case may include a suggested function vector that indicates "0" for all of the candidate functions and "1" for "No Function Suggested". Alternatively, the suggestion server 200 may not perform re-learning of the learned model based on a suggestion result notification.

In a case where the application running in the user terminal 100 is an application for which suggestion-based function invocation is disabled, the execution control unit 160 may not transmit a suggestion request to the suggestion server 200 or may not invoke a suggested function. For example, it may be considered undesirable to a user who is running a movie player to view a movie content if a displayed pop-up window interferes with his or her viewing. The same applies to a user who is running a game application to enjoy a game. Therefore, by refraining from making a suggestion from the system in such a situation, it is possible to avoid unintentionally impairing the user's convenience.

The execution control unit 160 may control enablement and disablement of function suggestion from the system per content instead of per type of application. For example, the execution control unit 160 may refrain from transmitting a suggestion request to the suggestion server 20 during running a movie player when a specific movie content is being reproduced. For which type of content the function suggestion is enabled or disabled may be configured by the user. For example, in a situation where a content is being reproduced in which a user is deeply immersed, the user's facial expression will be strongly affected by the content, meaning that the facial expression is likely to greatly change irrespective of usability. Hence, by disabling the function suggestion based on a change in facial expressions in such a situation, it is possible to avoid causing undesirable results such as resources being wasted for useless evaluation of facial expressions, and an inappropriate function being suggested.

<2-2. Suggestion Server>

Figure 4B:
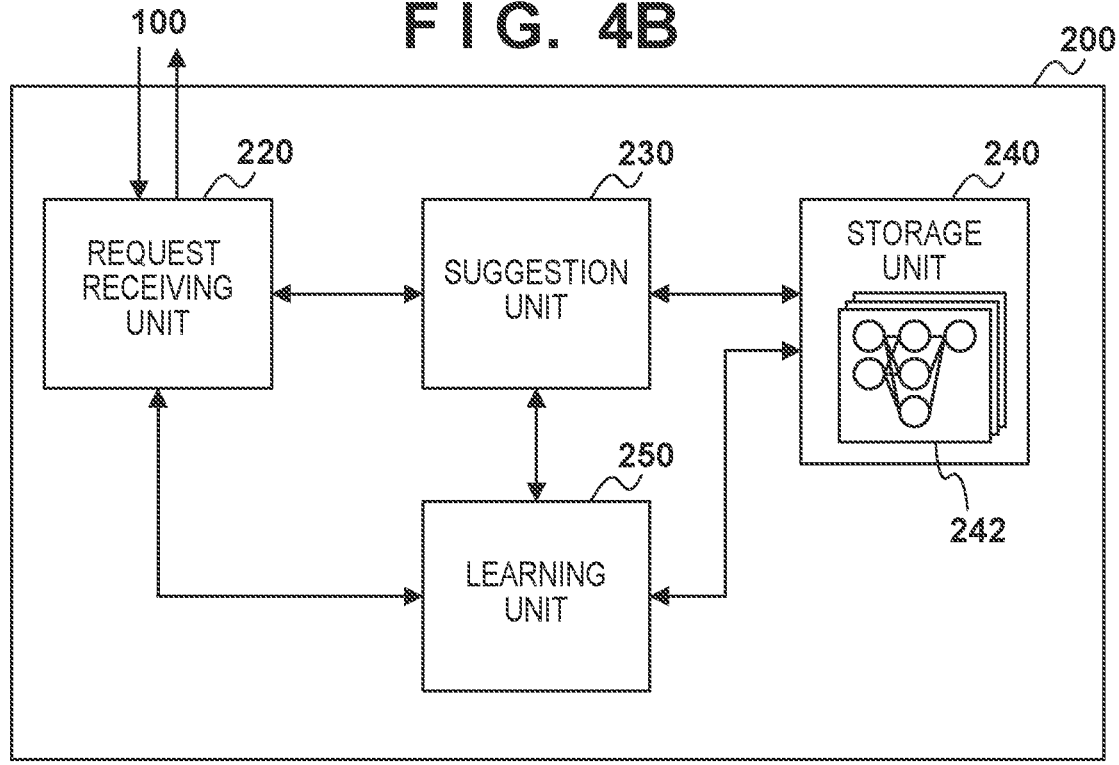
FIG. 4B is a block diagram illustrating an example of a functional configuration of a suggestion server according to an embodiment.

FIG. 4B is a block diagram illustrating an example of a functional configuration of the suggestion server 200 according to the present embodiment. Referring to FIG. 4B, the suggestion server 200 includes a request receiving unit 220, a suggestion unit 230, a storage unit 240 and a learning unit 250.

The request receiving unit 220 receives, via the communication I/F 205 from the user terminal 100, a suggestion request requesting a suggestion of a function to be invoked in the user terminal 100. The suggestion request includes face image data representing a face image of a user of the user terminal 100, as described above. The suggestion request may further include an AP ID that identifies an application running in the user terminal 100, and a user ID that identifies the user. The request receiving unit 220 outputs the received suggestion request to the suggestion unit 230.

The suggestion unit 230 determines a suggested function to be invoked in the user terminal 100 by applying, to the learned model 242, the face image data included in the suggestion request received by the request receiving unit 220. For the initial period of introduction of the user terminal 100, the learned model 242 is a default model which is common to multiple users, and it will become a user-specific model through above-described repetitions of re-learning. Hence, the suggestion unit 230 utilizes the learned model 242 associated with the user ID included in the suggestion request when determining a suggested function. The AP ID included in the suggestion request may also be an input parameter to the learned model 242. As a consequence, the suggested function determined by the suggestion unit 230 is different depending on the running application identified by the AP ID. The suggestion unit 230 outputs, to the request receiving unit 220, a suggestion response that identifies the determined suggested function (for example, including a function ID that identifies the suggested function). The suggestion response is transmitted from the request receiving unit 220 via the communication I/F 205 to the user terminal 100. In this way, the suggestion unit 230 causes the user terminal 100 to invoke the suggested function.

The storage unit 240 stores the learned model 242 for determining a suggested function to be invoked in the user terminal 100 based on a user's face image data. For example, the storage unit 240 may store a set of default model parameters that are common to multiple users, and sets of user-specific model parameters acquired through re-learning performed by the learning unit 250 described below.

After the transmission of the suggestion response to the user terminal 100, the request receiving unit 220 waits for the above-described learning request or suggestion result notification to be received from the user terminal 100. If the learning request is received via the communication I/F 205, the request receiving unit 220 outputs the learning request to the learning unit 250. Meanwhile, if the suggestion result notification is received, the request receiving unit 220 outputs the suggestion result notification to the learning unit 250.

The learning unit 250 performs re-learning of the learned model 242 when the learning request requesting re-learning of the learned model is received from the user terminal 100. The learning unit 250 performs the re-learning using the face image that it has applied to the learned model 242 in determining the suggested function as an image for learning, with the function suggested to the user terminal 100 prior to the learning request as right function. Data for learning will be the pair of this image for learning and the AP ID included in the suggestion request. The suggested function vector as training data may indicate "1" for the suggested function and "0" for the other candidate functions. The learning unit 250 performs the re-learning per user based on the user ID that may be included in the learning request. That is, the learning unit 250 may update, through the re-learning, the set of model parameters of the learned model 242 stored in the storage unit 240 in association with the designated user ID. Through repetitions of such re-learning, the ability of the suggestion server 200 to appropriately determine a suggested function that is really suitable for an individual user based on the learned model 242 will be continuously enhanced. In a case where a suggestion result notification is received from the user terminal 100, as described above, the learning unit 250 may not perform the re-learning of the learned model 242.

<<3. Process Flows>>

<3-1. Process in User Terminal>

Figure 7:
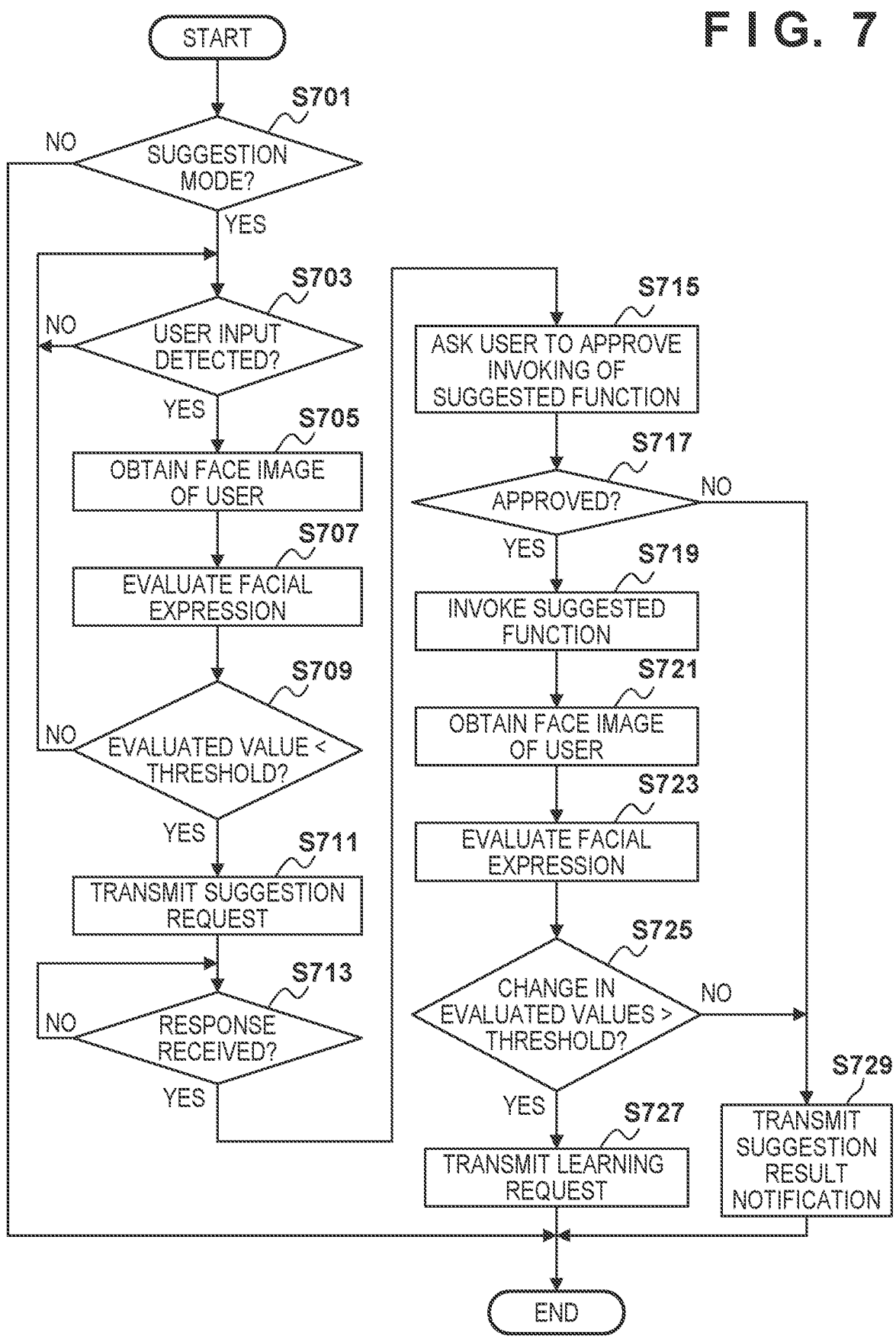
FIG. 7 is a flowchart illustrating an example of a flow of a process performed by the user terminal according to an embodiment.

FIG. 7 is a flowchart illustrating an example of a flow of a process performed by the user terminal 100 according to the present embodiment. The process illustrated in FIG. 7 may be realized by the controller 101 executing a computer program loaded from the ROM 102 to the RAM 103, for example. Note that 'S (Step)' in the following descriptions is an abbreviation of 'process step'.

At the beginning of the flowchart, it is assumed that a certain application is running in the user terminal 100. In S701, the execution control unit 160 determines whether the suggestion mode for suggesting a function to a user is enabled or not. For example, the execution control unit 160 may determine that the suggestion mode is enabled when the running application is not an application for which the suggestion mode is disabled. Alternatively, the execution control unit 160 may determine that the suggestion mode is enabled when the content being reproduced is not a content for which the suggestion mode is disabled. If it is determined that the suggestion mode is enabled, the process proceeds to S703. Meanwhile, if it is determined that the suggestion mode is disabled, the flowchart of FIG. 7 ends.

In S703, the execution control unit 160 monitors user's operations. For example, when a predetermined user input to the input device 106 is detected, the process proceeds to S705, and the execution control unit 160 instructs the expression evaluation unit 130 to evaluate the user's facial expression. Note that, as described above, the evaluation of the user's facial expressions may be performed periodically, irrespective of a user input. In S705, the image obtaining unit 120 obtains a face image of the user imaged by the camera 105. Next, in S707, the expression evaluation unit 130 obtain a facial expression evaluated value (the first facial expression evaluated value) by applying, to the evaluation model 142, the face image of the user obtained by the image obtaining unit 120. Next, in S709, the execution control unit 160 determines whether the facial expression evaluated value obtained by the expression evaluation unit 130 is below the suggestion request threshold or not. If it is determined that the facial expression evaluated value is below the suggestion request threshold, the process proceeds to S711. Meanwhile, it is determined that the facial expression evaluated value is not below the suggestion request threshold, the process goes back to S703.

When it is determined that the facial expression evaluated value is below the suggestion request threshold, in S711, the execution control unit 160 transmits, via the communication I/F III to the suggestion server 200, a suggestion request requesting a suggestion of a function to be invoked in the user terminal 100. The suggestion request includes face image data obtained by the image obtaining unit 120, an AP ID identifying the running application, and a user ID identifying the user. Next, in S713, the execution control unit 160 waits for a suggestion response to be received from the suggestion server 200. When the suggestion response is received from the suggestion server 200, the process proceeds to S715.

In S715, the execution control unit 160 requests an approval from the user for invoking the suggested function specified by the suggestion response received from the suggestion server 200, for example, by displaying the pop-up window 610 described using FIG. 6. The subsequent process branches depending on whether the invoking of the suggested function is approved by the user or not. If the invoking of the suggested function is approved, the process proceeds to S719. Meanwhile, if the invoking of the suggested function is not approved, the process proceeds to S729.

If the invoking of the suggested function is approved, in S719, the execution control unit 160 invokes the suggested function specified by the suggestion response. Next, in S721, the image obtaining unit 120 obtains a face image of the user imaged by the camera 105. Next, in S723, the expression evaluation unit 130 obtain a facial expression evaluated value (the second facial expression evaluated value) by applying, to the evaluation model 142, the face image of the user obtained by the image obtaining unit 120.

Next, in S725, the execution control unit 160 determines whether the change in the facial expression evaluated values obtained by the expression evaluation unit 130 (for example, a difference of the second facial expression evaluated value with respect to the first facial expression evaluated value) is above the teaming request threshold or not. If it is determined that the change in the facial expression evaluated values is above the learning request threshold, the process proceeds to S727. Meanwhile, if it is determined that the change in the facial expression evaluated values is not above the learning request threshold, the process proceeds to S729.

In S727, as the condition that the degree of change in the user's facial expressions is above the learning request threshold is satisfied, the execution control unit 160 transmits, via the communication I/F 111 to the suggestion server 200, a learning request requesting re-learning of the learned model 242. On the other hand, in S729, the execution control unit 160 transmits, via the communication I/F III to the suggestion server 200, a suggestion result notification notifying that the invoking of the suggested function has been refused or that the suggested function was not suitable for the user. Then, the flowchart of FIG. 7 ends.

<3-2. Process in Suggestion Server>

Figure 8:
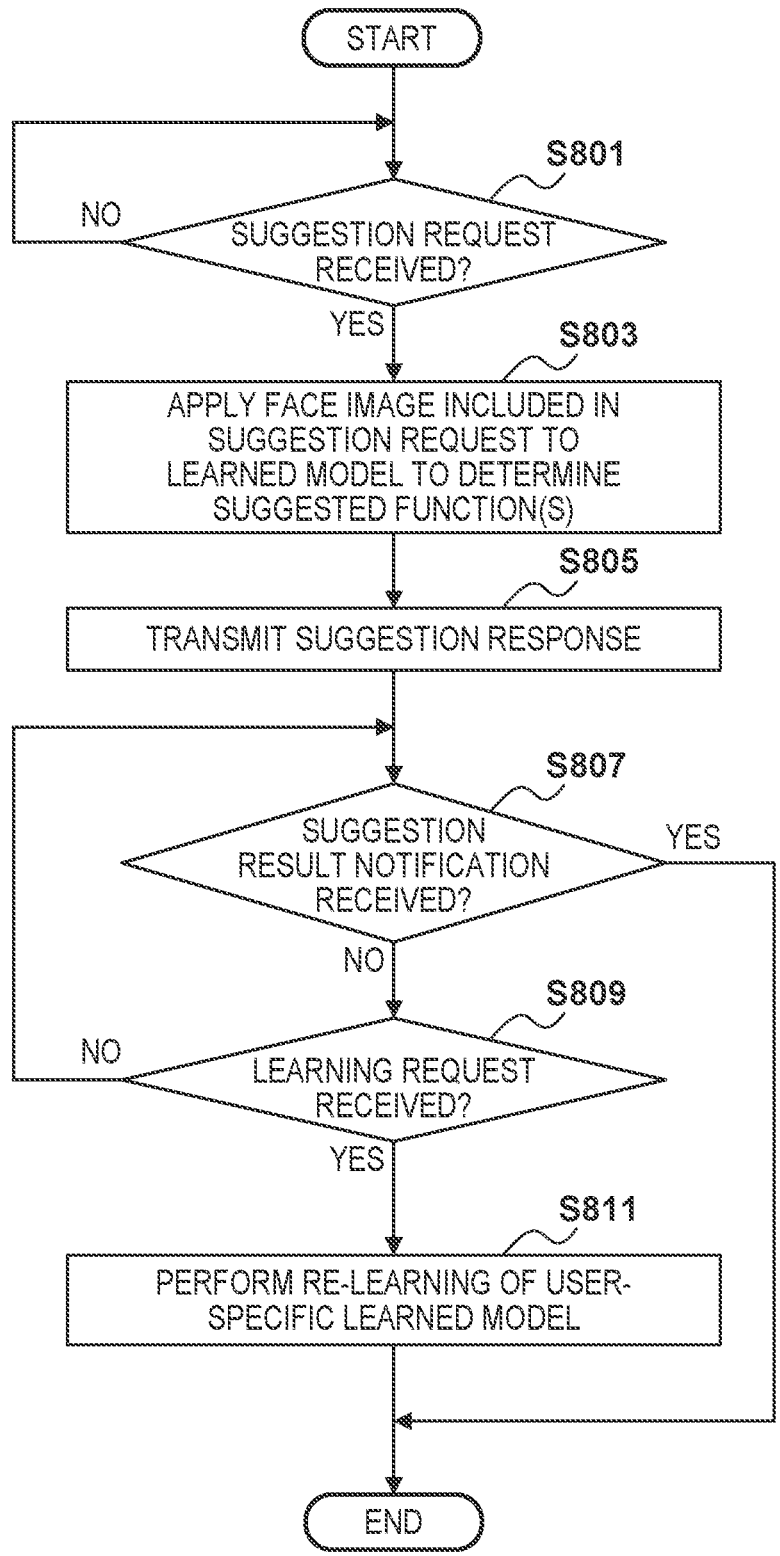
FIG. 8 is a flowchart illustrating an example of a flow of a process performed by a suggestion server according to an embodiment.

FIG. 8 is a flowchart illustrating an example of a flow of a process performed by the suggestion server 200 according to the present embodiment. The process illustrated in FIG. 8 may be realized by the CPU 201 executing a computer program loaded from the HDD 204 to the RAM 203, for example.

First, in S801, the request receiving unit 220 waits for a suggestion request to be received from the user terminal 100, which requests a suggestion of a function to be invoked in the user terminal 100. When the suggestion request is received via the communication VF 205, the process proceeds to S803. As described above, the suggestion request may include face image data of a user, an AP ID identifying an application running in the user terminal 100, and a user ID identifying the user.

In S803, the suggestion unit 230 determines a suggested function to be invoked in the user terminal 100 by applying, to the learned model 242 (stored in association with the user ID), the face image data included in the suggestion request (and the AP ID). Next, in S805, the suggestion unit 230 causes the request receiving unit 220 to transmit, to the user terminal 100, a suggestion response that specifies the determined suggested function.

Next, in S807 and S809, the request receiving unit 220 waits for a learning request or a suggestion result notification to be received from the user terminal 100. In a case where the learning request is received, in S811, the learning unit 250 performs re-learning of the user-specific learned model 242 using the face image data (and the AP ID) used in determining the suggested function as data for learning, with the suggested function determined in S803 as the right function. In the example of FIG. 8, in a case where a suggestion result notification is received, the learning unit 250 skips re-learning. Then, the flowchart of FIG. 8 ends.

It should be noted that, in S811, the learning unit 250 may cause the storage unit 240 to temporarily store the data for learning in association with training data indicating the suggested function as the right function, and may perform re-learning, at a timing when a certain amount of data for learning has been accumulated, using the accumulated data all together. Additionally, the learning unit 250 may also perform re-learning when a suggestion result notification is received.

4. Conclusion

The embodiments of the present disclosure have been described above in detail with reference to FIGS. 1 to 8. In the above-described embodiments, a function to be invoked in a terminal apparatus is determined in a server apparatus in response to a suggestion request including user's face image data by applying the face image data to a learned model. Then, the suggested function determined by the server apparatus is invoked by the terminal apparatus. When a degree of change in facial expressions of the user before and after invoking the suggested function satisfies a predetermined condition, the terminal apparatus makes a request to the server apparatus that re-learning using the face image data be performed on the learned model. According to such a configuration, the learned model for determining a suggested function can be reinforced through the re-learning based on actual user's facial expressions in practical situations. This makes it possible to suggest a more appropriate function to a user based on a facial expression of the user. I will also possible to aid the user by the function suggestion from the server apparatus even in a case where the user uses a user terminal with relatively weak computational resources.

In the above-described embodiments, the learning request may include user identification information that identifies the user, and the re-learning of the learned model may be performed per user to acquire a user-specific model. According to such a configuration, since an individual difference in change in facial expressions of the user will be reflected in the learned model through the re-learning, it will be more likely that a function suggested after the re-learning is suitable for each user.

In the above-described embodiments, an evaluation model to calculate an evaluated value of the change in facial expressions is provided. Then, the degree of change in facial expressions of the user may correspond to a change between two evaluated values obtained by applying, to the evaluation model, two face images obtained before and after the invocation of the suggested function. According to such a configuration, effective re-learning of the learned model can be facilitated based on quantitative evaluation of the degree of change in facial expressions. For example, when a difference between the two evaluated values exceeds a first threshold or when a change between the two evaluated values indicates that a degree of satisfaction of the user has improved, the re-learning of the learned model may be performed. In these cases, it is inferred that the suggested function was really suitable for the user. Hence, the possibility that the subsequent processes suggest an appropriate function can be raised by performing re-learning with the suggested function as a right function to be suggested.

In the above-described embodiments, the suggestion request may be transmitted to the server apparatus when an evaluated value obtained by applying a user's face image to the evaluation model is below a second threshold. According to such a configuration, it is possible to recognize, from the user's facial expression captured in the face image, a situation that the user feels inconvenience or dissatisfaction with an operation of an application or viewing of a content, for example, and to timely suggest invoking a function suitable for the user. It is also possible to effectively reinforce the learned model based on a result of the function suggestion in such a situation (for example, a result that the inconvenience or dissatisfaction of the user has been resolved).

In the above-described embodiments, the suggestion request may include application identification information that identifies an application running in the terminal apparatus, and the suggested function may be different depending on the running application. According to such a configuration, as an adequate function for an individual application will be flexibly suggested to the user, the user's inconvenience or dissatisfaction can more surely be resolved.

5. Alteration Examples

The present invention is not limited to the above embodiments, and there may exist various alterations. For example, an example where a function to be invoked during running a certain application has been mainly described above. However, the above-described embodiments may also be employed in order to suggest a function to aid a user when the user operates an operation system (OS) instead of when running an application.

Moreover, a neural network model has been mainly described as an example of the learned model. The neural network may have any number of layers, and so-called deep learning may be performed by arranging a large number of layers. The above-described embodiments may also be applicable to a model based on a machine learning algorithm other than the neural network, such as nearest neighbor method, Naïve Bayes method, decision tree, or support vector machine, for example.

Furthermore, though an example where not the user terminal but the suggestion server determines a suggested function has been mainly described above, the user terminal may determine a suggested function by itself in a standalone manner. In that case, the user terminal has functional blocks which are similar to the suggestion unit 230, the storage unit 240 and the learning unit 250 of the suggestion server 200. Then, in a case where a degree of change in user's facial expressions before and after invoking the suggested function determined by itself satisfies a predetermined condition, the user terminal performs re-learning of the learned model used in determining a suggested function. It will be possible, also in such a case, to suggest a more appropriate function to a user because the learned model for determining a suggested function is reinforced through the re-learning based on user's actual facial expressions.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-018213, filed on Feb. 5, 2020 which is hereby incorporated by reference herein in its entirety.

What is claimed is:

1. A terminal apparatus comprising:
a communication interface configured to communicate with a server apparatus; and
a controller, wherein the controller is configured to:
obtain a first face image of a user of the terminal apparatus;
obtain a first evaluated value corresponding to the first face image of the user;
compare the first evaluated value corresponding to the first face image of the user with a first threshold;
transmit, (i) in a case where the comparison of the first evaluated value corresponding to the first face image of the user and the first threshold indicates that the first evaluated value corresponding to the first face image of the user is less than the first threshold and (ii) via the communication interface to the server apparatus, a suggestion request requesting a suggestion of a function to be invoked in the terminal apparatus;
receive, via the communication interface from the server apparatus, a suggestion response that specifies a suggested function determined by the server apparatus in response to the suggestion request; and
invoke the suggested function specified by the suggestion response,
wherein the suggestion request includes face image data of the user of the terminal apparatus, and the suggested function is determined by applying the face image data to a learned model at the server apparatus,
wherein the controller is configured to:
evaluate, based on face images of the user, a degree of change in facial expressions of the user before and after invoking the suggested function; and
transmit, via the communication interface to the server apparatus, a learning request requesting re-learning of the learned model when the evaluated degree of change in the facial expressions satisfies a predetermined condition.

2. The terminal apparatus according to claim 1, wherein the learning request includes user identification information that identifies the user, and
the re-learning of the learned model is performed per user to acquire a user-specific model.

3. The terminal apparatus according to claim 1, wherein the controller is configured to:
obtain the first evaluated value by applying, before invoking the suggested function, the first face image of the user to an evaluation model for calculating an evaluated value of change in facial expression of the user based on a face image of the user; and
obtain a second evaluated value by applying a second face image of the user to the evaluation model after invoking the suggested function; and wherein the degree of change in the facial expressions corresponds to change from the first evaluated value to the second evaluated value.

4. The terminal apparatus according to claim 3, wherein the predetermined condition includes a difference between the first evaluated value and the second evaluated value being above a second threshold.

5. The terminal apparatus according to claim 3, wherein the evaluation model is acquired in advance through machine learning using images for learning which are face images of a plurality of persons labeled with degrees of satisfaction as training data, and
the predetermined condition includes that the change from the first evaluated value to the second evaluated value indicates that the degree of satisfaction has improved.

6. The terminal apparatus according to claim 4, wherein the re-learning of the learned model is performed using the first face image as an image for learning with the suggested function as right function to be suggested.

7. The terminal apparatus according to claim 1, wherein the suggestion request includes application identification information that identifies an application running in the terminal apparatus, and
the suggested function determined by the server apparatus is different depending on the application running in the terminal apparatus.

8. The terminal apparatus according to claim 1, further comprising an image capture device configured to capture the first face image of the user.

9. A function suggestion method performed by a terminal apparatus, the function suggestion method comprising:
obtaining a first face image of a user of the terminal apparatus;
obtaining a first evaluated value corresponding to the first face image of the user;
comparing the first evaluated value corresponding to the first face image of the user with a first threshold;
transmitting, (i) in a case where the comparison of the first evaluated value corresponding to the first face image of the user and the first threshold indicates that the first evaluated value corresponding to the first face image of the user is less than the first threshold and (ii) from the terminal apparatus to a server apparatus, a suggestion request requesting a suggestion of a function to be invoked in the terminal apparatus;
receiving, by the terminal apparatus from the server apparatus, a suggestion response that specifies a suggested function determined by the server apparatus in response to the suggestion request; and
invoking, by the terminal apparatus, the suggested function specified by the suggestion response,
wherein the suggestion request includes face image data of the user of the terminal apparatus, and the suggested function is determined by applying the face image data to a learned model at the server apparatus,
wherein the function suggestion method further comprises:
evaluating, based on face images of the user, a degree of change in facial expressions of the user before and after invoking the suggested function; and
transmitting, from the terminal apparatus to the server apparatus, a learning request requesting re-learning of the learned model when the evaluated degree of change in the facial expressions satisfies a predetermined condition.

10. A non-transitory computer-readable storage medium having stored therein a computer program which, when executed by a processor of a terminal apparatus, causes the terminal apparatus to:
  obtain a first face image of a user of the terminal apparatus;
  obtain a first evaluated value corresponding to the first face image of the user;
  compare the first evaluated value corresponding to the first face image of the user with a first threshold;
  transmit, (i) in a case where the comparison of the first evaluated value corresponding to the first face image of the user and the first threshold indicates that the first evaluated value corresponding to the first face image of the user is less than the first threshold and (ii) to the server apparatus, a suggestion request requesting a suggestion of a function to be invoked in the terminal apparatus, the suggestion request including face image data of the user of the terminal apparatus;
  receive, from the server apparatus, a suggestion response that specifies a suggested function determined by the server apparatus in response to the suggestion request, the suggested function being determined by applying the face image data to a learned model at the server apparatus;
  invoke the suggested function specified by the suggestion response;
  evaluate, based on face images of the user, a degree of change in facial expressions of the user before and after invoking the suggested function; and
  transmit, to the server apparatus, a learning request requesting re-learning of the learned model when the evaluated degree of change in the facial expressions satisfies a predetermined condition.

11. A server apparatus comprising:
  a communication interface configured to communicate with a terminal apparatus configured to obtain a first face image of a user of the terminal apparatus, obtain a first evaluated value corresponding to the first face image of the user, and compare the first evaluated value corresponding to the first face image of the user with a first threshold; and
  a controller, wherein the controller is configured to:
  receive, (i) in a case where the comparison of the first evaluated value corresponding to the first face image of the user and the first threshold indicates that the first evaluated value corresponding to the first face image of the user is less than the first threshold and (ii) via the communication interface from the terminal apparatus, a suggestion request requesting a suggestion of a function to be invoked in the terminal apparatus, the suggestion request including face image data of the user of the terminal apparatus;
  determine the function to be invoked in the terminal apparatus by applying the face image data to a learned model;
  transmit, via the communication interface to the terminal apparatus, a suggestion response that specifies the determined function to thereby cause the terminal apparatus to invoke the function; and
  in a case where a learning request requesting re-learning of the learned model is received via the communication interface from the terminal apparatus, perform the re-learning of the learned model using a face image indicated by the face image data as an image for learning with the determined function as right function.

12. A terminal apparatus comprising:
  an image obtaining unit configured to image a user to thereby obtain a face image of the user;
  a control unit configured to:
    obtain a first evaluated value corresponding to the face image of the user;
    compare the first evaluated value corresponding to the face image of the user with a first threshold:
    invoke, among functions of the terminal apparatus and in a case where the comparison of the first evaluated value corresponding to the face image of the user and the first threshold indicates that the first evaluated value corresponding to the face image of the user is less than the first threshold, a function determined by applying the face image to a learned model; and
  a learning unit configured to perform re-learning of the learned model when a degree of change in facial expressions of the user before and after invoking the function satisfies a predetermined condition.

13. The terminal apparatus according to claim 1, wherein the controller is configured to not transmit the suggestion request requesting the suggestion of the function to be invoked in the terminal apparatus in a case where the comparison of the first evaluated value corresponding to the first face image of the user and the first threshold indicates that the first evaluated value corresponding to the first face image of the user is greater than the first threshold.

\* \* \* \* \*